May 12, 1942. P. FINNEGAN 2,282,399
MANUFACTURE OF LAMINATED GLASS
Filed June 27, 1940 4 Sheets-Sheet 1

INVENTOR
Patrick Finnegan

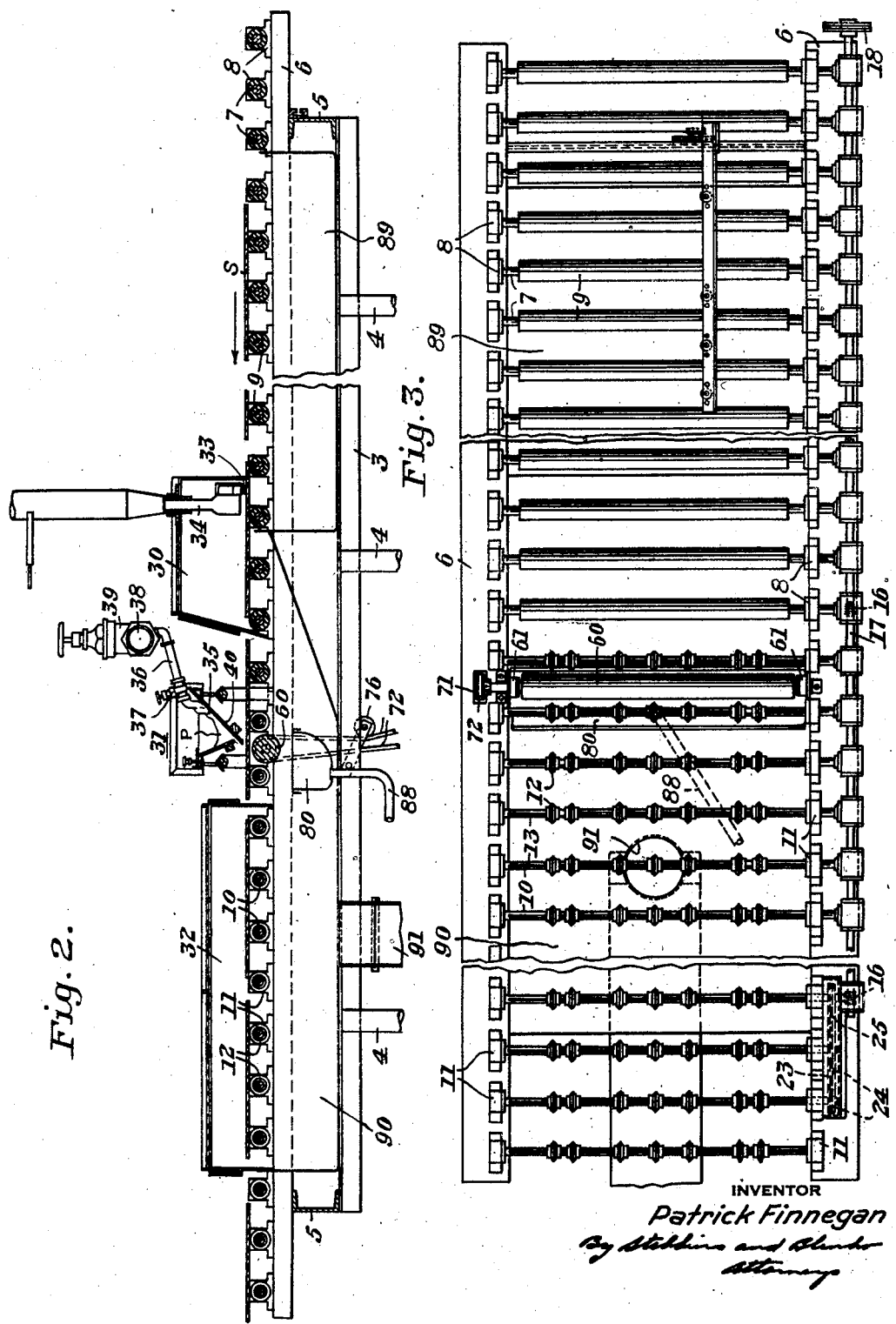

May 12, 1942.   P. FINNEGAN   2,282,399
MANUFACTURE OF LAMINATED GLASS
Filed June 27, 1940   4 Sheets-Sheet 3

INVENTOR
Patrick Finnegan

May 12, 1942.　　　P. FINNEGAN　　　2,282,399
MANUFACTURE OF LAMINATED GLASS
Filed June 27, 1940　　　4 Sheets-Sheet 4

INVENTOR
Patrick Finnegan

Patented May 12, 1942

2,282,399

UNITED STATES PATENT OFFICE 2,282,399

MANUFACTURE OF LAMINATED GLASS

Patrick Finnegan, Jeannette, Pa., assignor to American Window Glass Company, Pittsburgh, Pa., a corporation of Pennsylvania Application June 27, 1940, Serial No. 342,746

4 Claims. (Cl. 49—81.5)

The present invention relates generally to the manufacture of laminated glass, and more particularly to the liquid or flow process of manufacturing laminated glass.

In the liquid or flow process of manufacturing laminated glass, the glass sheets are first mechanically or chemically cleaned and are then placed upon conveying apparatus for conveying the glass sheets past appropriate work stations. In one of the processes which is now being used commercially, the glass sheets are carried by the conveying mechanism into and through an enclosure which is provided with brushing and exhausting mechanism for brushing the glass sheets to remove any particles of dust or lint that may be adhering thereto and for exhausting these particles from adjacent the surfaces of the sheets. Thereafter, the sheets are carried by the conveying mechanism past a filming machine. As the glass sheets are moved past the filming machine, a relatively thin film of a solution of a suitable strengthening material is flowed on the glass sheets. The conveying mechanism then carries the coated glass sheets through a relatively short enclosed chamber. The glass sheets with the coatings thereon are then transferred to other conveying mechanism which carries the coated sheets through an elongated drying chamber. In this chamber the films or coatings on the sheets are heated to such an extent as to drive off a substantial portion of the solvent or other volatile constituents contained therein. When the coated glass sheets are discharged from the exit end of the drying chamber, one of each pair of sheets is flooded with a contacting agent and a sandwich formed of that sheet and another one. Thereafter, the sandwich is passed between rolls which squeeze out any excess contacting agent between the two films on the glass sheets and effect a preliminary contacting. Thereafter, the sandwiches are stacked vertically on a truck, and after the truck has been filled it is transferred to a pressure chamber where the sandwiches are subjected to sufficient pressure to effect a strong bond between the two coatings on the sheets.

In the carrying out of this liquid process as practiced heretofore commercially, some difficulties have been encountered. A movable slat type of conveyor has heretofore been used for transporting the glass sheets past the filming machine, the glass sheets being supported on raised blocks carried by the movable slats of the conveyor. As it is necessary to have the glass sheets spaced from each other at least a short distance, difficulty has been encountered in preventing the strengthening material which flows downwardly past the leading, rear and side edges of the glass sheets from contaminating the conveying mechanism. As a consequence, it has heretofore been found necessary to place paper on the conveying mechanism beneath the glass sheets in order to catch the strengthening material flowing past the edges of the glass sheets. The strengthening material flowing downwardly past the side edges of the glass sheets does not necessarily flow on these papers as it can be caught by appropriate pans or cups and recovered. It will be apparent, however, that the strengthening material flowing past the leading and rear edges of the glass sheets cannot be recovered in this way but has to be deposited on the paper positioned beneath the sheets. This strengthening material cannot be returned to the feeding mechanism and reused without expensive reconditioning thereof. As the quantity of this material which cannot be reused is very substantial and as materials capable of being used in processes of this character are quite expensive, this loss materially increases the manufacturing costs. Consequently, it is one of the objects of my invention to eliminate this loss and thereby materially reduce manufacturing costs.

The use of paper or any other similar material beneath the glass sheets during the filming operation is quite objectionable. In the first place, it materially adds to the cost of the process not only because of the cost of the paper itself but also because of the fact that it requires twice as many men to load the conveyor and place the paper thereon as is required where the paper is eliminated. In the second place, small particles of lint or dirt come from the paper or other material and are deposited on the glass sheets. These small particles of dust or lint from the paper are hard to detect except upon close examination of the glass sheets and frequently they are not removed from the glass sheets by the exhausting mechanism positioned adjacent the filming feeder, and, if not, they form nuclei for bubbles and cause rejects. These rejects materially increase manufacturing costs. These objectionable features of the present liquid process are entirely eliminated by my invention.

In the liquid process, it is necesary that the film of strengthening material fed from the filming feeder downwardly onto the glass sheets be wider than the glass sheets. The viscosity of the strengthening material is quite low and if a film narrower than the glass sheet is formed and flowed on the glass sheet, it will not level off and completely cover the top surface of the sheet. This is objectionable because it causes difficulty in the further processing of the coated sheets and, in fact, results in a high percentage of rejects. If, on the other hand, a solution of strengthening material having a higher viscosity is used, it will tend to flow over the edges of the glass sheets to such an extent as to thin down the strengthening material adjacent the edges of the sheet and this will cause difficulty and expense in the final compositing operation. For these reasons, a solution of strengthening material having a relatively low viscosity is used and the film formed by the filming feeder is wider than the glass sheets and the viscosity regulated or controlled in such a way as to cause the solution of strengthening material to cut off along the edges of the glass sheets. In order to obtain a proper cut-off, it is necessary to carefully control the operating conditions as well as the viscosity of the solution of strengthening material. Even where careful control is exercised, some difficulties are encountered and a proper film is not formed on the glass sheets with the result that rejects are occasioned.

By the present invention, I provide a method whereby a much better and more uniform control can be obtained over the formation of the film of strengthening material on the glass sheets, particularly along the edges thereof. Where my invention is utilized, I have found it possible to maintain uniform edge conditions in the film of strengthening material on the glass sheets and to modify as desired the thickness and the general contour of the film of strengthening material adjacent the edges of the glass sheets. In carrying out my invention, I use a roller type of conveying mechanism for carrying the glass sheets past the filming station. Where this type of conveyor, as distinguished from the movable slat type, is used it is possible to utilize a rotating roll positioned beneath the filming feeder, and this rotating roll or other similar movable device will receive the excess strengthening material flowed over the edges of the glass sheets and it can be passed to a collecting pan and returned to the supply of strengthening material and reused. I have found that where mechanism of this character is employed, the strengthening material losses are reduced to a minimum.

In addition, where a rotating roll or other similar movable device is utilized for receiving the excess material flowed downwardly past the edges of the glass sheets, the roll or other device can be moved at such a speed as to definitely control the cut-off along the edges of the glass sheets in such a way as to provide substantially uniform films along the edges of the glass sheets. I have also found that by appropriate control of the relative speeds of the conveying mechanism and the roll or other similar movable mechanism, the character of the thickness of the film along the edges can be controlled so that if it is desirable either a lighter or a heavier film can be formed along the edges than adjacent the central portion of the glass sheets. In some cases, this is highly desirable.

Where my invention is not utilized and the excess strengthening material dropping downwardly past the edges of the glass sheets is merely deposited in appropriate pans or cups, there is a slight depression in the film of strengthening material on the glass sheets spaced inwardly from the edges thereof a short distance. Between these depressions and the edges, there is somewhat of a hump of strengthening material. Due to the fact that the viscosity of the strengthening material is relatively low, there is an insufficient flow of the strengthening material over the glass sheets to iron out this hump around the edge of each glass sheet and the adjacent depression. Where my invention is used, I have found that this depression and the adjacent hump can be eliminated entirely satisfactorily so as to provide a film on each glass sheet which is substantially uniform in thickness from one edge to the other edge. This is of substantial importance as it facilitates the compositing operation.

In the accompanying drawings, I have shown for purposes of illustration only a preferred apparatus for carrying out my invention. In the drawings, Fig. 1 is a side elevation of the apparatus which may be employed in carrying out my invention;

Fig. 2 is a central longitudinal section through the apparatus shown in Fig. 1 with the lower portion of the apparatus removed;

Fig. 3 is a plan view of the conveying table shown in Fig. 1;

Figure 1:
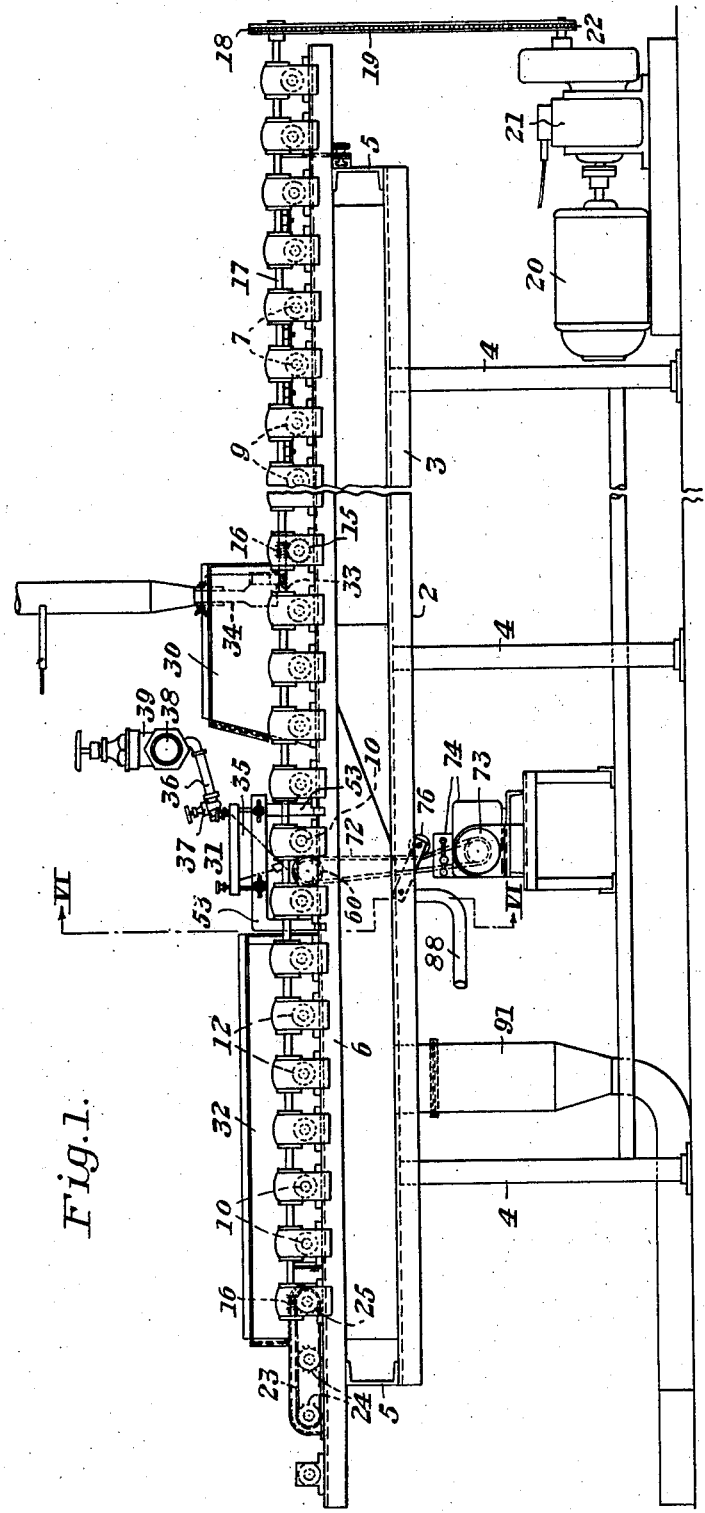
Figure 5:
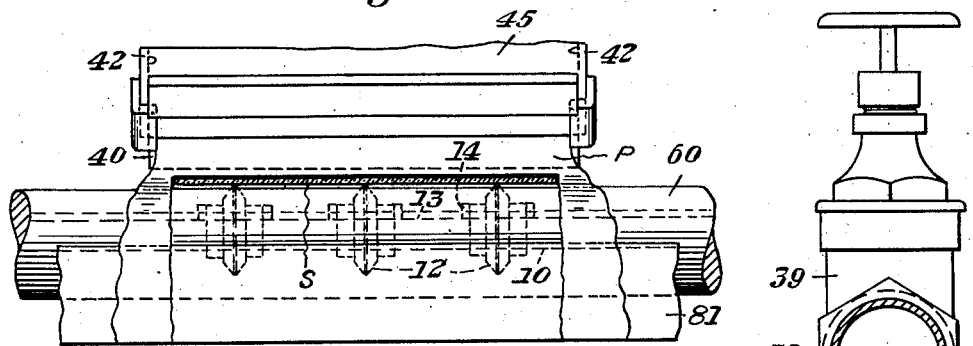
Fig. 5 is a section taken along the line V—V of Fig. 4.

As shown in the drawings, the apparatus which I employ embodies a frame 2 comprising longitudinally extending angles 3 mounted on legs 4, transversely extending channels 5 mounted on the angles 3 and longitudinally extending channel members 6 mounted on the transverse channels 5. A plurality of shafts 7 are mounted in bearings 8 located on opposite sides of the frame and each shaft 7 is provided with a rubber sleeve 9 which forms the surface upon which the glass sheets are carried along the conveyor. The sleeves 9 are preferably of rubber but they may be made of any other suitable material which will provide sufficient frictional engagement with the glass sheets to cause them to be carried at a relatively uniform rate of speed along the conveying mechanism.

A plurality of conveying shafts 10 are also mounted on the frame in bearings 11. These shafts are not provided with rubber sleeves as are the shafts 7, but each shaft has keyed to it a plurality of glass-supporting disks 12. These disks are preferably of some suitable pressed composition and are beveled to a point so that the bearing surfaces between the disks and the glass sheets will be reduced to a minimum. Each shaft 10 is provided with a keyway 13 which extends substantially throughout the entire length of the shaft and the disks are keyed thereto by means of wedge shaped keys 14. The purpose of having the keyways 13 extend substantially throughout the lengths of the shafts is in order to permit the proper positioning of the disks according to the particular sizes of glass being used. The shafts 7 and all of the shafts 10 except the one at the exit end of the conveying mechanism extend beyond the bearings on the one side of the frame and each shaft, with the exception of the last three of shafts 10, has keyed to it a worm gear 15 which cooperates with a worm 16 driven by a drive shaft 17. The drive shaft 17 at its one end carries a sprocket wheel 18 driven by a chain 19 which, in turn, is driven by a motor 20 through speed reducing mechanism 21 and a sprocket wheel 22. Two of the shafts adjacent the discharge end of the conveying mechanism are not driven directly by the drive shaft 17 but are driven by means of a chain 23 which cooperates with sprocket wheels 24 carried on these shafts. This chain also extends over a sprocket 25 carried by the last shaft 10 driven by the main drive shaft 17.

By means of this arrangement, the glass sheets are carried at a relatively uniform rate of speed through the cleaning chamber 30, past the filming mechanism indicated generally by the reference character 31, and through the enclosed chamber 32.

As each glass sheet passes into the cleaning chamber 30, a brush 33 loosens any dust or lint particles that may be on the surface thereof and these loosened particles are removed from the top surface of the glass sheet by an exhausting tube 34 connected to an exhauster (not shown).

After passing through the chamber 30, each glass sheet passes beneath the filming mechanism 31 which comprises a trough-shaped filming feeder 35 and a conduit 36 for supplying the strengthening material to the feeder. A valve 37 is provided in the conduit 36 for controlling the rate of flow of the strengthening material to the feeder. The conduit 36 connects with a main header 38 having a control valve 39 therein. The main header 38 communicates directly with the supply of the strengthening material.

Figure 4:
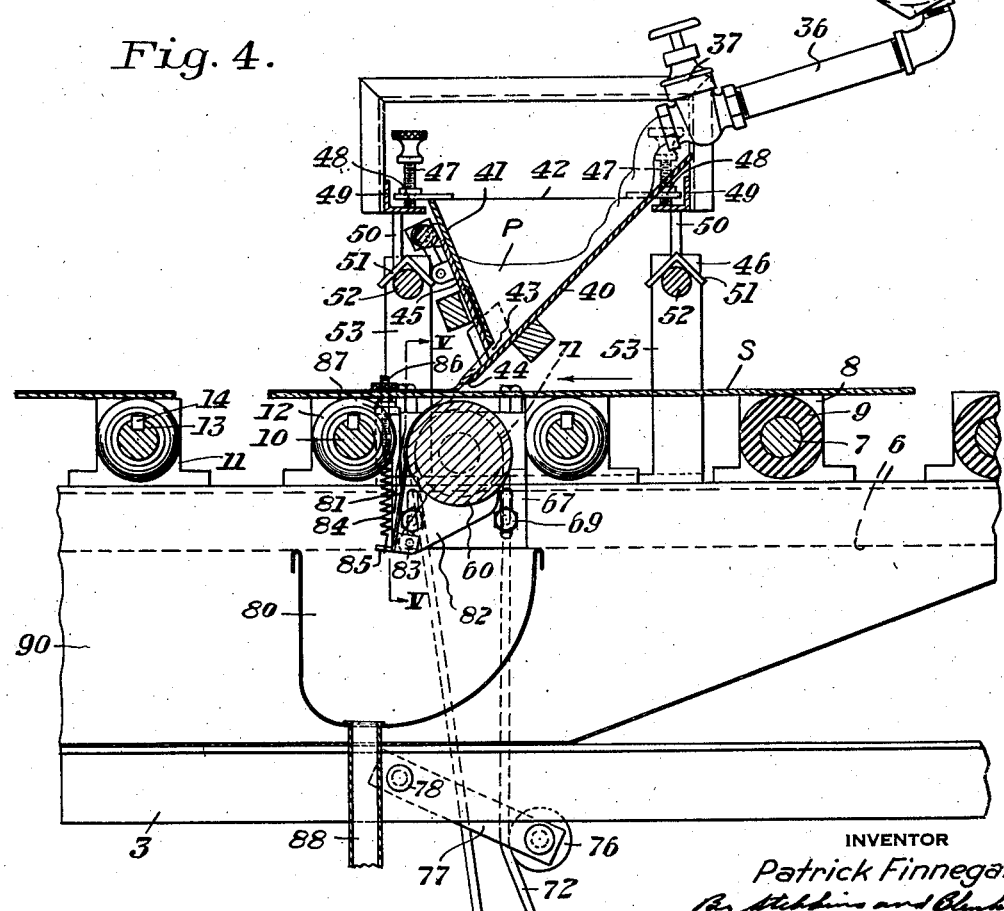
Fig. 4 is an enlarged central longitudinal section through the filming apparatus.
Figure 6:
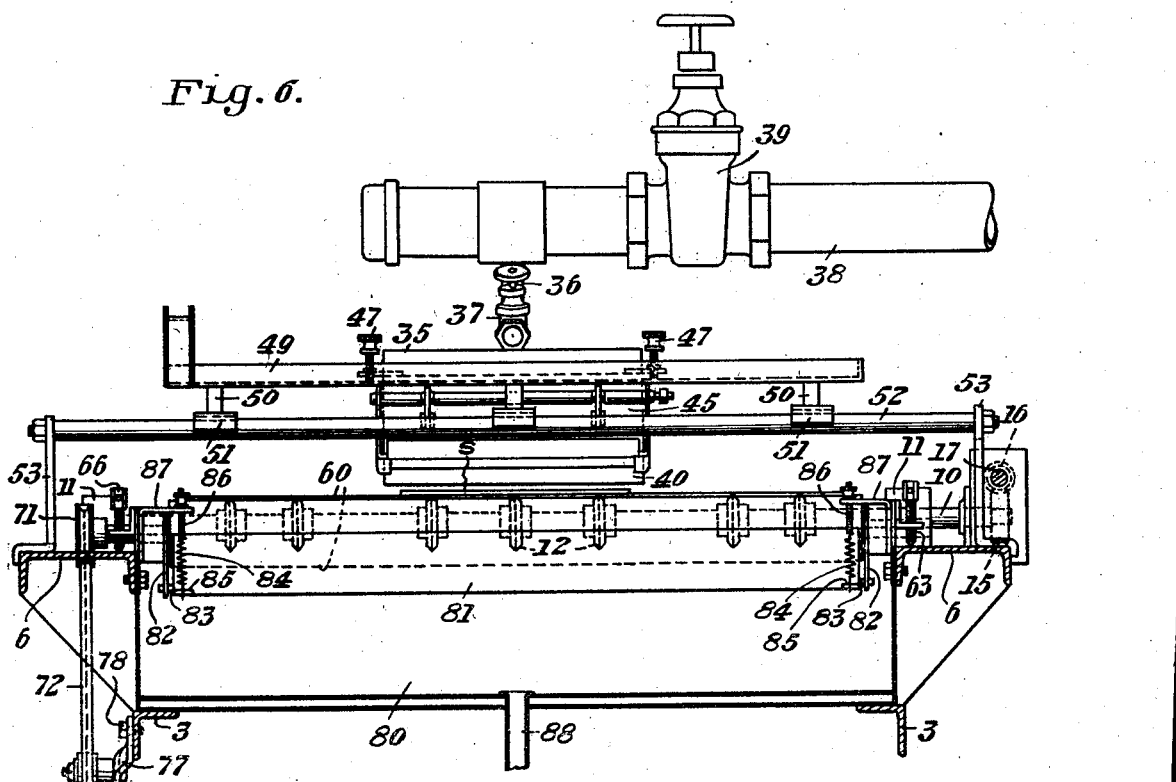
Fig. 6 is a section taken along the line VI—VI of Fig. 1.
Figure 7:
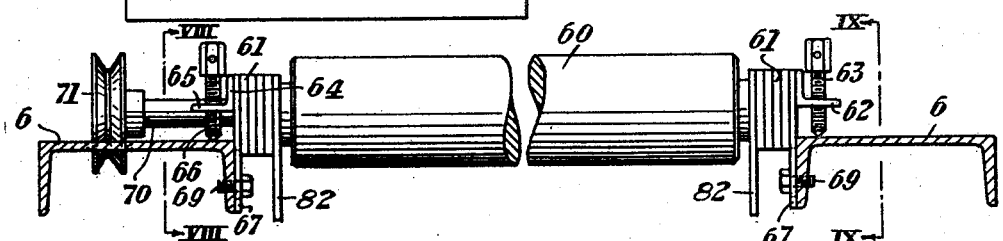
Fig. 7 is a view partly in section and partly in elevation showing the roll on which the strengthening material is deposited.
Figures 8, 9:
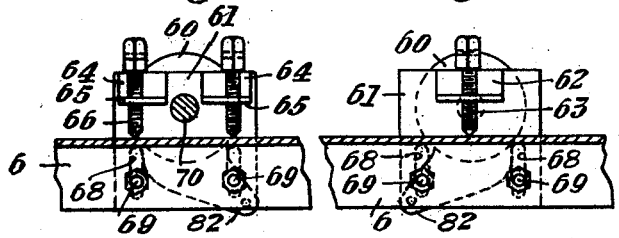
Fig. 8 is a section taken along the line VIII—VIII of Fig. 7.
Fig. 9 is a section taken along the line IX—IX of Fig. 7.

The filming feeder 35 is formed of a bottom or rear plate 40, a front plate 41 and side plates 42. The front plate 41 is spaced slightly above the bottom or rear plate 40 so as to provide an orifice 43 through which the strengthening material P may flow. The bottom or rear plate 40 extends below the orifice 43 a substantial distance so that after the strengthening material passes through the orifice it will have an opportunity to spread or flow to some extent in order to form a film of substantially uniform thickness before passing over the bottom edge thereof. As shown in Fig. 4, the bottom edge 44 of the plate 40 is beveled rearwardly so that a sharp point is provided over which the strengthening material passes immediately before flowing onto the glass sheet S. The beveling of the bottom edge of this flow plate rearwardly is quite important in apparatus of this character as it prevents the material from freezing along the discharge edge. An adjustable plate 45 is mounted on the front plate 41 of the filming machine and this plate may be moved up or down in order to vary the size of the orifice 43 in order to provide the desired thickness of strengthening material on each glass sheet.

The filming feeder is supported on a frame indicated generally by the reference numeral 46. Adjusting screws 47 are threaded through brackets 48 carried by the filming feeder and these adjusting screws bear on the transversely extending angles 49 of the frame 46. By means of these adjusting screws, the height of the feeder above the glass sheets can be adjusted. The frame 46 is provided with downwardly extending legs 50 to which are welded angles 51 adapted to rest on the rods 52 which extend transversely of the conveying mechanism and are carried on the channels 6 by brackets 53.

As pointed out above, the width of the film of strengthening material P flowing over the bottom edge of the filming feeder is necessarily somewhat wider than the glass sheet being filmed. This excess strengthening material, as well as the excess strengthening material deposited by the feeder in the space between the rear edge of one light of glass and the leading edge of the adjacent light of glass, is deposited on a driven roll 60. This roll 60 may be of any suitable diameter and may be suitably located beneath the discharge end of the plate 40 of the feeder. The roll 60 is mounted in bearings 61 adjustably supported on the channels 6. A bracket 62 is mounted on the one bearing 61 and a set screw 63 extends through the horizontally extending leg of this bracket and the bottom end thereof rests upon the adjacent channel 6. The other bearing 61 carries two brackets 64 having horizontally extending portions 65 through which are threaded set screws 66 which bear upon the adjacent channel 6. By appropriate adjustment of the set screws 63 and 66, the roll 60 may be raised or lowered to suit particular operating conditions. Each bearing 61 is provided with a downwardly extending arm 67 and each arm has two slots 68 therein adapted to receive a screw 69 threaded in the adjacent bracket 6 for assisting in holding the roll in any adjusted position.

The shaft 70 of the roll 60 extends beyond one of the bearings 61 and at its outer end carries a grooved wheel 71 which is keyed thereto. The roll 60 is driven through this grooved wheel by means of a belt 72, a motor 73, gear reducing and speed control mechanism 74 and a grooved wheel 75 which is driven by the gear reducer and speed controlling mechanism. In view of the fact that the roll 60 is vertically adjustable, provision is made for taking up any slack in the belt 72. This is accomplished by a roller 76 rotatably mounted on an arm 77 which is adjustably mounted on the adjacent channel 3 by a screw 78.

In operation, the excess strengthening material flows onto the roll 60 and is discharged therefrom into a trough 80 which is positioned below the roll and which extends transversely of the conveying mechanism. A spring-depressed doctor blade 81 is mounted adjacent the roll for assisting in the removal of the excess strengthening material from the roll. The doctor blade 81 is pivotally mounted on brackets 82 depending from the bearings 61 for the roll 60. The pivots 83 of the doctor blade are located adjacent the lower end thereof and the springs 84, the lower ends of which are connected to fingers 85 mounted on the doctor blade and the upper ends of which are mounted on set screws 86, normally force the upper end of the doctor blade into contact with the roll 60. The set screws 86 are threaded through brackets 87 and may be adjusted vertically so that the springs may be placed under appropriate tension.

The trough 80 into which the excess material is deposited has a bottom outlet 88 through which the excess strengthening material is exhausted by means of an exhauster (not shown) and returned to the main supply of strengthening material.

Troughs 89 and 90 are provided beneath the conveying mechanism to catch any dirt, glass or strengthening material that might be dropped from the glass sheets or the conveying mechanism. The trough 90 also serves another purpose. It has a bottom outlet 91 connected to an exhauster (not shown). The purpose of this outlet and the exhauster is to withdraw from adjacent the apparatus some of the solvent contained in the strengthening material which may have vaporized during and just after the filming operation. The solvent normally employed in the liquid process is, in general, heavier than air and, consequently, little difficulty is experienced in withdrawing this solvent from adjacent the apparatus. It is desirable to withdraw this solvent as it is obnoxious and some of it can be recovered.

It will be evident from what has been stated above that in order to achieve best results it is desirable to properly correlate the different variables. The distance between the top of the cut-off roll and the top surface of the glass sheets being filmed, the relative speeds of the glass and the cut-off roll, the viscosity of the solution of strengthening material, the position of the feeder with regard to the roll, i. e., the location of the slot relative to the center of the roll, and the height of the feeder above the glass can all be varied somewhat and varying results achieved. Where the viscosity of the solution of strengthening material is between 28 and 32 poises, it is preferable to have the driven cut-off roll located about ⅛ of an inch below the bottom of the glass sheet passing thereover. Under such conditions, the peripheral speed of the cut-off roll should be slightly greater than the peripheral speed of the conveying mechanism. It is also preferable under such conditions to have the discharge edge of the feeder located approximately ⅛ of an inch behind the center of the roll. The discharge edge of the feeder should also be located approximately ½ inch above the top surface of the glass sheet passing thereunder.

When the peripheral speed of the driven cut-off roll is increased so that it is appreciably greater than the peripheral speed of the conveying mechanism, the strengthening material along the edges of the glass sheet is thinned down to a substantial extent. Under such conditions and also when the peripheral speed of the driven roll is only slightly greater than the speed of the conveying mechanism, the hump which is normally present at each side edge of the film on the glass sheet and the valley or depression which is normally present immediately behind the hump along each edge are totally eliminated. However, it is not desirable to employ a very substantial speed differential in operations as the strengthening material along the side edges of the glass sheet is thinned down too greatly.

When the driven cut-off roll is driven at a peripheral speed of approximately one-fourth that of the peripheral speed of the conveying mechanism, I have found that the strengthening material along the side edges can be thickened to a very substantial extent. With this speed differential, I have found that the strengthening material along the edges can be built up approximately .009 inch on the wet film and approximately .003 inch on the dry film. It will be appreciated that this is a substantial build-up along the edges as the thickness of the wet film on each glass sheet is normally only .030 inch and the normal thickness of the dried film is about .009 inch. The measurements stated above were taken approximately ½ inch in from the edge of the glass and, consequently, it will be seen that when desired an appreciable build-up of strengthening material along the edges can be effected and that this build-up extends inwardly of the edges of the glass sheet for a substantial distance. In normal operations, this build-up is not desirable as it is preferable to have the film on each glass sheet substantially uniform from one edge to the other edge thereof. Where operating conditions such as those mentioned above as being the preferable operating conditions are employed, substantially uniform films are obtained and the cut-off of the strengthening material along the edge of the glass sheet is substantially uniform and there is no flowing of the film over the edges of the glass sheets.

In addition to the variables mentioned above, the diameter of the cut-off roll can be modified in order to obtain varying results. Where the diameter is appreciably reduced below that indicated in the drawings, the driving speeds must be reduced in order to maintain an appropriate relationship between the peripheral speeds of the roll and the conveying mechanism.

It will be evident from what has been stated above that the present invention effects material savings in manufacturing costs and that it provides a much better control over the filming operation that can be obtained by prior art methods.

I claim:

1. In the manufacture of laminated glass, the steps comprising moving the sheet of glass in substantially horizontal position past a filming station, flowing a film of a solution of strengthening material wider than the glass sheet downwardly toward and onto the top surface of the sheet as it is carried past the filming station, and, while the film is being flowed onto the glass sheet, exerting a pull on the portion of the film passing downwardly past the edges of the glass sheet in excess of that exerted on the film by the glass sheet.

2. In the manufacture of laminated glass, the steps comprising moving a sheet of glass in substantially horizontal position past a filming station, flowing a film of a solution of strengthening material wider than the glass sheet downwardly toward and onto the top surface of the sheet as it is carried past the filming station, and, while the film is being flowed onto the glass sheet, controlling the thickness of the film along the side edges of the top surface of the glass sheet by exerting a pull having a downward component on the portion of the film passing downwardly past the edges of the glass sheet in excess of that exerted on the film by the glass sheet.

3. In the manufacture of laminated glass, the steps comprising moving a sheet of glass in substantially horizontal position past a filming station, flowing a film of a solution of strengthening material wider than the glass sheet downwardly toward and onto the top surface of the sheet as it is carried past the filming station, and, while the film is being flowed onto the glass sheets, exerting a downward and forward pull on the portion of the film passing downwardly past the edges of the glass sheet sufficiently in excess of the downward and forward pull on the film exerted by the glass sheet to prevent the material from building up adjacent the edge of the sheet to a greater thickness than adjacent the center thereof.

4. In the manufacture of laminated glass, the steps comprising moving a sheet of glass in substantially horizontal position past a filming station, flowing a film of a solution of strengthening material wider than the glass sheet downwardly toward and onto the top surface of the sheet as it is carried past the filming station, collecting the excess material flowing past the edges of the glass sheet on a movable member, and moving the movable member at a speed greater than that of the glass sheet to pull downwardly and forwardly the portion of the film of strengthening material extending beyond the edges of the glass sheet to prevent the material from building up adjacent the edge of the sheet to a greater thickness than adjacent the center.

PATRICK FINNEGAN.